Jan. 13, 1931.   J. G. TAWSE   1,789,027
LOADING PLATFORM
Filed Oct. 11, 1929
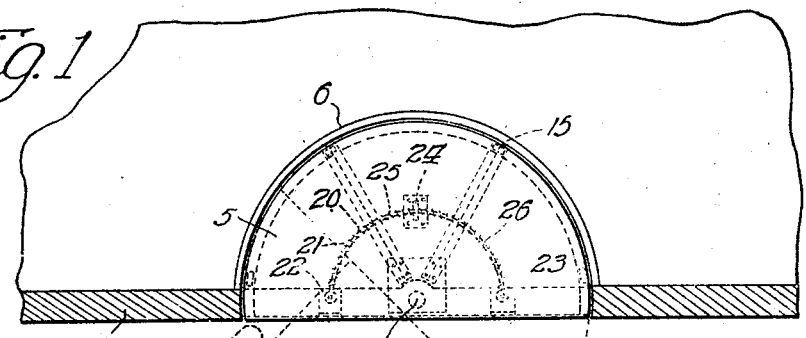
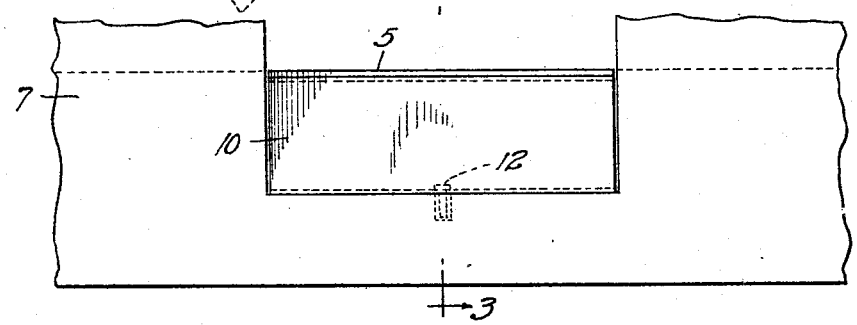
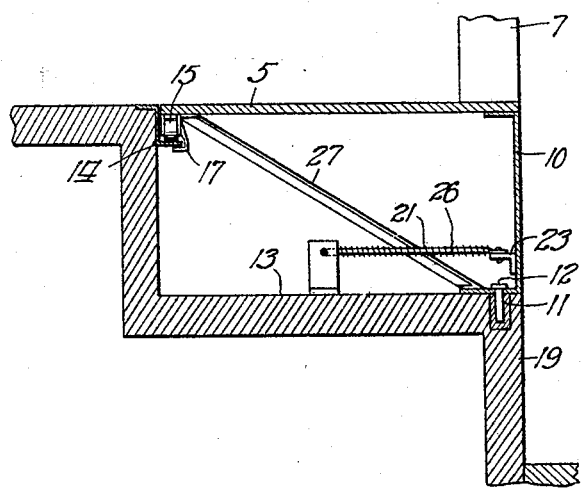
Inventor
John G. Tawse Patented Jan. 13, 1931

1,789,027

UNITED STATES PATENT OFFICE

JOHN G. TAWSE, OF EVANSTON, ILLINOIS

LOADING PLATFORM

Application filed October 11, 1929. Serial No. 398,947.

This invention relates to loading platforms and has for its principal object the provision of means in connection with such platforms for facilitating the loading and unloading of vehicles at the platform.

The device embodied in this invention may be used at any level in buildings, platforms, and the like where loading and unloading from vehicles is being carried on.

In many cases where vehicles are loading and unloading at a platform much time is lost due to the maneuvering of the vehicles to align them properly with the platform, and, in many cases where it is not possible to obtain a sufficiently good alignment, double handling becomes necessary in order to transfer goods from the vehicle body to the platform or vice versa. It is particularly difficult in alleys and narrow drive ways along side of ware houses and loading platforms to obtain a good contact between the platform and the vehicle body such for instance as a truck body for loading and unloading.

One of the purposes of this invention is to provide means on the platform which can be engaged by a vehicle body and caused by the pressure of the body to form a practically perfect butt joint with the rear end of the body.

It is also a purpose of this invention to provide a device of this character in which the movable portion of the platform is so mounted as to normally maintain itself in alignment with the side edge of the loaded platform.

Other and more specific objects and advantages of this invention will appear as the description proceeds in connection with the accompanying drawings. It is to be understood, however, that the invention is not limited to the particular details shown and described and that it includes such obvious modifications as would occur to one skilled in this art and as fall within the scope of the claims.

In the drawings—

Fig. 1 is a top plan view of the device showing it as forming part of the loading platform at the door of the building;

Fig. 2 is a front view of the device shown in Fig. 1; and

Fig. 3 is a section on the line 3—3 of Fig. 2.

Referring now in detail to the drawings, this device consists essentially of a platform 5 which forms with the main loading platform 6 of the building 7 a fairly close joint along the arc of the circle which has its center substantially at the edge of the building as for instance at 8. The movable platform, therefore, is substantially semicircular. This platform may be made of any suitable material capable of withstanding the loads applied thereto.

The movable platform is supported by means of a channel beam 10 extending across the front thereof and pivoted as at 11 by means of a pin 12 to the floor of a pit 13 in which it operates. Also along the curved joint between the movable platform and the main floor portion 6 there are provided supporting means consisting of a trackway 14 and suitable rollers 15 so as to form a rolling bearing for the periphery of the movable section 5.

In order to avoid tipping of the movable section, which might be possible if for instance it occupied the position shown in dotted lines shown in Fig. 5 and the heavy load were placed at 16, there are provided in connection with the rollers and track just described a series of securing plates such as shown at 17 in Fig. 3 which plates extend beneath the track so as to normally clear it, but which are adapted to engage the track upon a slight upward movement of the section 5.

The front channel beam 10 forms a baffle against which the back end of the vehicle such as the truck 18 illustrated in Fig. 1 may engage. This baffle may, of course, be made of any suitable height to adapt it to the various levels of vehicle bodies that are to be used in connection with the loading platform. Preferably it is made of considerable height so as to take care of any variations in the vehicle bodies and prevent their being damaged by striking the solid wall 19 below the baffle.

The action of the platform when the vehicle approaches is believed to be clear from the showing in Fig. 1. Of course, if the vehicle can back directly up to the platform at right angles thereto, the movable section will remain with the front bumper 10 substantially in alignment with the side edge of the platform. This, however, requires quite a bit of skill on the part of the driver and in some cases it is practically impossible due to the narrowness of the passageway along side of the loading platform or building. The vehicle may then approach at an angle in the manner illustrated by the truck body 18 in Fig. 1, and in so doing the rear end of the vehicle body will, of course, strike the movable section 5 at an acute angle and cause it to swing about its pivot point 8 until such time as the vehicle body and the front bumper 10 align with each other to form a good joint. The movable section 5 is, of course, made considerably wider than the vehicle bodies so as to permit maneuvering of the trucks or vehicles without any great degree of accuracy as to their longitudinal position along the side of the platform.

This invention also contemplates a novel means for maintaining the platform 5 normally in alignment with the edge of the loading platform. This means consists of a resilient device such as indicated generally by the numeral 20 for opposing any movement of the movable platform out of alignment of the edge of the loading platform. More specifically the resilient device consists of a substantially semi-circular rod 21 secured at its opposite ends 22 and 23 to the channel beam 10 and passing at 24 through an upstanding guide member which is mounted on the floor of the pit 13. Interposed between the guide at 24 and the opposite ends of the rod 21 are a pair of compression springs 25 and 26 which springs are balanced so as to normally hold the platform in proper position.

Now, however, when the platform 5 is turned about its center, it is done against the pressure of one or the other of the springs 25 or 26 so that upon release of the pressure by the removal of the vehicle body these springs will return the platform to its normal position and hold it there until it is moved by another vehicle body.

Suitable braces such as shown at 27 may be provided wherever found necessary to strengthen the construction of the movable section.

From the above description it is thought that the construction and advantages of this device will be clear to those skilled in this art; and, having thus described my invention, what I claim as new and desire to secure by Letters Patent is:

1. In a loading platform having a stationary floor portion, a movable section at one edge of said platform, said section meeting said floor portion along the arc of a circle and being mounted to turn about the center of said circle, said movable section having an edge portion at the edge of said platform which may be turned to align with the body of an approaching vehicle, and yielding means normally holding said edge portion substantially in alignment with the side edge of said platform.

2. In a loading platform having a stationary floor portion, a movable floor section interfitting with said stationary floor portion to form a continuation thereof, said movable section having an edge portion normally substantially aligning with the edge of said platform, said movable section being yieldable under pressure from an approaching vehicle body to align said edge portion with the approaching edge of said body.

3. In a loading platform having a stationary floor portion, a movable floor section interfitting with said stationary floor portion to form a continuation thereof, said movable section having an edge portion normally substantially aligning with the edge of said platform, said movable section being yieldable under pressure from an approaching vehicle body to align said edge portion with the approaching edge of said body, and means returning said movable body to normal position upon removal of the pressure from the vehicle body.

4. In a loading platform having a stationary floor portion, a movable section at one edge of said platform, said section meeting said floor portion along the arc of a circle and being mounted to turn about the center of said circle, said movable section having a buffer flange at the edge of said platform extending downwardly from the floor level whereby it may be engaged by the rear end of a vehicle body being backed up to said platform and thereby turn said movable section into alignment with the approaching end of the vehicle body.

5. In a loading platform having a stationary floor portion, a movable section at one edge of said platform, said section meeting said floor portion along the arc of a circle and being mounted to turn about the center of said circle.

6. In a loading platform having a stationary floor portion, a movable section at one edge of said platform, said section meeting said floor portion along the arc of a circle and being mounted to turn about the center of said circle, and supporting means for said movable section including a track and a plurality of rollers.

7. In a loading platform having a stationary floor portion, a movable section at one edge of said platform, said section meeting said floor portion along the arc of a circle and being mounted to turn about the center of said circle, and supporting means for said movable section including a track and a plurality of rollers, said rollers and track being mounted along the meeting edges of said stationary floor and movable section.

8. In a loading platform having a stationary floor portion, a movable section at one edge of said platform, said section meeting said floor portion along the arc of a circle and being mounted to turn about the center of said circle, said movable section being substantially semi-circular in plan and having its center of rotation at one edge of said platform.

9. In a loading platform having a stationary floor portion, a movable section at one edge of said platform, said section meeting said floor portion along the arc of a circle and being mounted to turn about the center of said circle, and spring means for normally maintaining said movable section in one definite position relative to said floor portion.

10. In a loading platform having a stationary floor portion, a movable section at one edge of said platform, said section meeting said floor portion along the arc of a circle and being mounted to turn about the center of said circle, means pivotally supporting said movable section and means at the meeting edges of said portion and section to prevent tipping of said movable section.

In witness whereof, I hereunto subscribe my name this 9th day of October, A. D. 1929.

JOHN G. TAWSE.